United States Patent
Pham

(10) Patent No.: US 8,123,826 B2
(45) Date of Patent: Feb. 28, 2012

(54) PROCESS FOR THE CONVERSION OF OIL-BASED LIQUID FUELS TO A FUEL MIXTURE SUITABLE FOR USE IN SOLID OXIDE FUEL CELL APPLICATIONS

(75) Inventor: Thang V. Pham, Dhahran (SA)

(73) Assignee: Saudi Arabian Oil Company (SA)

( * ) Notice: Subject to any disclaimer, the term of this patent is extended or adjusted under 35 U.S.C. 154(b) by 411 days.

(21) Appl. No.: 11/594,429

(22) Filed: Nov. 8, 2006

(65) Prior Publication Data
US 2008/0107932 A1    May 8, 2008

(51) Int. Cl.
*H01M 8/00* (2006.01)
(52) U.S. Cl. ............... 48/197 FM; 48/197 R; 48/198.1; 48/199 FM; 429/400; 429/425
(58) Field of Classification Search .............. 429/12–46; 48/61–197 A
See application file for complete search history.

(56) References Cited

U.S. PATENT DOCUMENTS
5,486,428 A    1/1996    Gardner et al.
(Continued)

FOREIGN PATENT DOCUMENTS
WO    03065488 A1    8/2003
(Continued)

OTHER PUBLICATIONS

Trimm, David L., et al., Onboard Fuel Conversion for Hydrogen-Fuel-Cell-Driven Vehicles, Catalyst Reviews, 2001, pp. 31-84, 43 (1&2), Marcel Dekker, Inc.

*Primary Examiner* — Imran Akram
(74) *Attorney, Agent, or Firm* — Bracewell & Giuliani LLP

(57) ABSTRACT

Processes for generating electricity using a solid oxide fuel cell are disclosed. The processes are controlled by adjusting the hourly spaced velocity of the hydrocarbon feed through the solid oxide fuel cell. Hydrocarbon fuel is transported at an hourly spaced velocity through a pre-reformer having a catalyst. The hydrocarbon fuel is contacted with the catalyst for a residence time and at a temperature such that a catalyzed hydrocarbon fuel is formed. The hourly spaced velocity determines the residence time of the hydrocarbon fuel in the pre-reformer. The resultant catalyzed hydrocarbon fuel contains at least one gas including one or more of hydrogen gas, methane gas, carbon monoxide gas, or combinations thereof. The catalyzed hydrocarbon fuel is then contacted with an anode of a solid oxide fuel cell for a residence time to produce electricity.

20 Claims, 1 Drawing Sheet

U.S. PATENT DOCUMENTS

| | | |
|---|---|---|
| 6,221,280 B1 | 4/2001 | Anumakonda et al. |
| 6,230,494 B1 | 5/2001 | Botti et al. |
| 6,811,904 B2 | 11/2004 | Gorte et al. |
| 6,841,279 B1 | 1/2005 | Foger et al. |
| 2003/0003033 A1* | 1/2003 | Taguchi et al. ............... 422/198 |
| 2003/0224230 A1 | 12/2003 | Stocker |
| 2004/0018144 A1 | 1/2004 | Briscoe |
| 2004/0229092 A1* | 11/2004 | Take ............................... 429/19 |
| 2005/0074642 A1 | 4/2005 | Foger |
| 2005/0081444 A1 | 4/2005 | Anumakonda et al. |
| 2005/0106428 A1 | 5/2005 | Bolden |
| 2005/0158594 A1 | 7/2005 | Ahmed |
| 2005/0172555 A1 | 8/2005 | Petch et al. |
| 2005/0176831 A1 | 8/2005 | Inui et al. |
| 2005/0188609 A1 | 9/2005 | Grieve et al. |
| 2005/0271912 A1 | 12/2005 | Hansen |
| 2006/0008413 A1 | 1/2006 | Garg et al. |
| 2006/0090398 A1 | 5/2006 | Katikaneni et al. |
| 2008/0102328 A1* | 5/2008 | Saunders et al. ................ 429/17 |

FOREIGN PATENT DOCUMENTS

| | | |
|---|---|---|
| WO | WO 03/098728 A1 | 11/2003 |
| WO | 2006010212 A1 | 2/2006 |

* cited by examiner

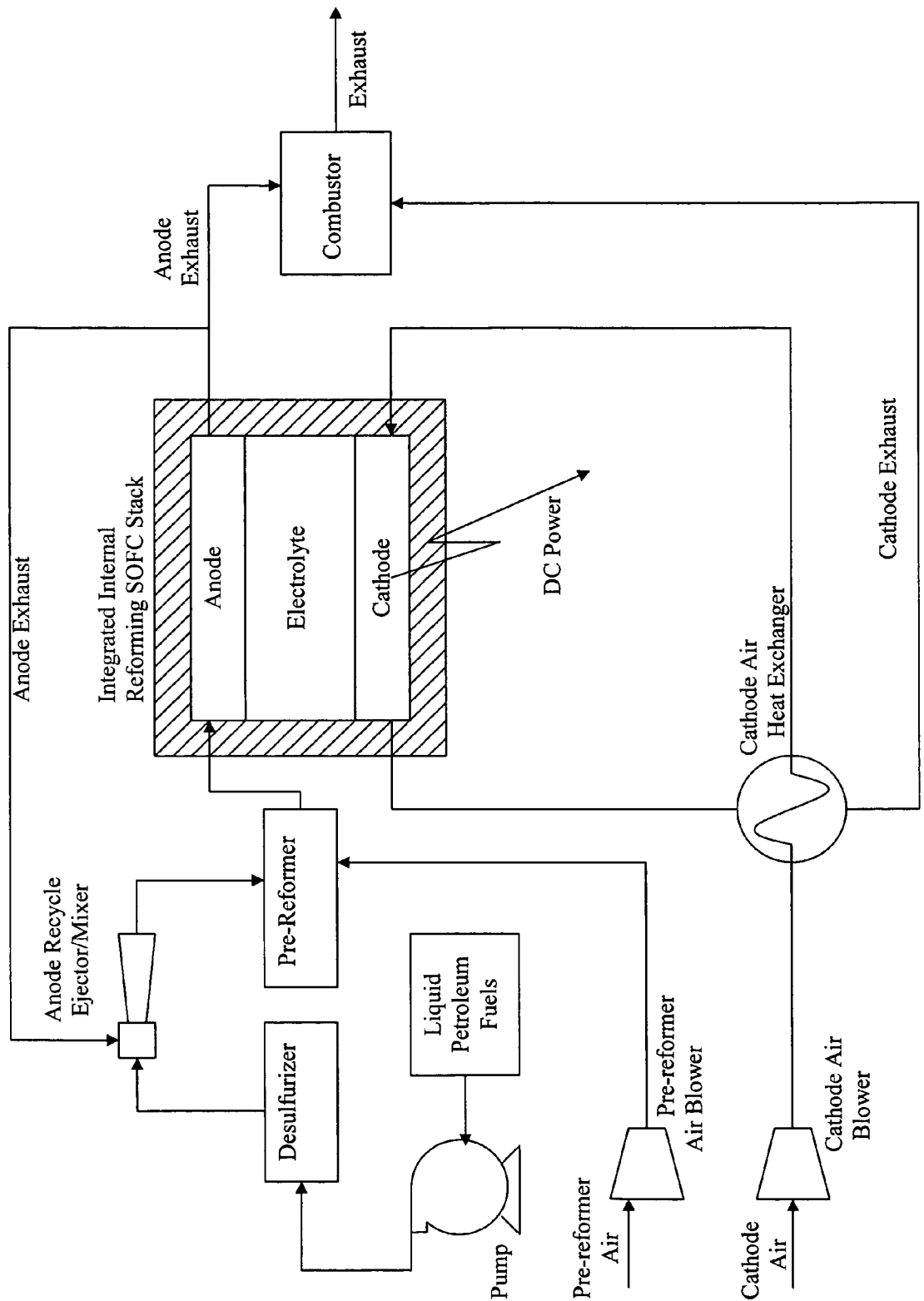

PROCESS FOR THE CONVERSION OF OIL-BASED LIQUID FUELS TO A FUEL MIXTURE SUITABLE FOR USE IN SOLID OXIDE FUEL CELL APPLICATIONS

BACKGROUND OF INVENTION

1. Field of the Invention

The present invention relates to a process that converts hydrocarbon or oil-based fuels to a variable mix of methane and hydrogen for solid oxide fuel cell ("SOFC") applications.

2. Description of Related Art

High temperature solid oxide fuel cells ("SOFCs") are energy conversion devices that directly convert chemical energy contained in the fuel feed to electrical energy. Being electrochemical devices, the conversion process in SOFCs is not limited by the Carnot heat cycle and can therefore achieve significantly higher efficiencies than conventional combustion engines or power stations.

Much of the momentum for SOFC development has been generated from environmental concerns because the high efficiency of SOFCs leads to lower $CO_2$ emissions per kWh output of useful energy, while emissions of harmful chemicals such as NOx, SOx and un-burnt hydrocarbons are virtually zero. Applications targeted for SOFC include distributed and centralized power generation, vehicle propulsion, remote area power generation, and marine, military and aerospace applications.

Thermodynamic considerations suggest that SOFCs have the direct capability to electrochemically oxidize a wide variety of solid, liquid, and gaseous hydrocarbon fuels. However, most SOFC systems available to date still require these hydrocarbon fuels to be initially processed into more electrochemically active species such as carbon monoxide (CO) and hydrogen ($H_2$). This processing requirement means that potentially any hydrogen and carbon containing materials could be used, provided it could be converted to CO and $H_2$. For reasons of availability, transportability, and cost, natural gas and oil-based liquid petroleum fuel are seen as the most promising fuel options for SOFCs. The conversion process of these fuels to produce $CO/H_2$ mixtures is known as "reforming."

SOFCs have a number of characteristics which allow reforming to occur directly on the anode chamber: the catalyst which facilitates the electrochemical oxidation of $CO/H_2$ mixtures is nickel based; nickel is the active metal in conventional steam reforming catalysts; the SOFC electrochemical reactions liberate heat and steam which are needed to support the endothermic reforming reaction; high conversions of hydrocarbons are further enhanced as CO and $H_2$ product gases of the reforming reaction are continually consumed through the electrochemical oxidation reactions; and complete conversion of hydrocarbon based fuel is possible at temperatures as low as 700-750° C.

The process scheme allowing reforming to occur in the anode chamber is known as internal reforming. Conversely, external reforming refers to schemes in which the hydrocarbon fuel processing occurs in a separate unit located outside the solid oxide fuel cell module.

Internal reforming SOFC is the favored configuration as it offers significant advantages over its external counterpart. It provides superior net power output, lower supply rates of cathode air, greater amounts of quality waste heat, smaller footprint size and modularity of SOFC stacks. However, thermodynamic consideration suggests that internal reforming SOFC configuration may not be able to maintain SOFC stack temperature at part-load operating condition—a typical requirement for both grid-independent stationary and automotive applications.

One of the limitations of using SOFC technology in grid-independent power generation and automotive transportation is its inability to meet demanding variable load requirement, especially if an internal reforming SOFC stack is employed. While an internal reforming SOFC stack represents the most efficient fuel cell configuration, whereby the heat requirement for the steam reforming reaction can be met using the internal heat generation from the electrochemical reactions for electricity generation, maintenance of thermal balance under part-load condition (down to 20%) is extremely difficult. The internal heat generation by the SOFC stack during internal reforming is not sufficient to satisfy both the internal reforming heat requirement as a well as the SOFC stack's heat loss, which is generally fixed at a level corresponding to full-load operating conditions. One prior attempt to address this limitation is the inclusion of an external heat source that results in increased inefficiency of the SOFC stack, a more complex design, and eventually higher cost.

Another shortcoming of using an internal reforming SOFC operating on oil-based liquid fuels is the increased propensity for carbon and tar formation. Oil-based liquid fuels contain high molecular weight hydrocarbons which tend to crack at the high operating temperature of SOFC stack forming undesirable solid carbon. Over time, accumulated carbon blocks active sites for reactions on the anode surface, and often leads to an increased pressure drop that would alter the flow distribution of fuels to the different layers within the stack module.

Accordingly, prior to the development of the present invention, there has been no reforming SOFC process or reforming SOFC system that: provides for reforming at part-load operating conditions without the need for an external heat source; provides for an internal reforming SOFC stack to maintain thermal balance under part-load conditions; converts hydrocarbon fuels such as oil-based fuels, into a variable mixture of $CH_4$, $H_2$, and CO; exploits the superior performance of an internal reforming SOFC stack while achieving power generation under part-load conditions; and provides an internal reforming SOFC stack with a pre-processed feed stream having compositions that reduce formation of tar and carbon within the SOFC stack. Therefore, the art has sought a reforming SOFC process and a reforming SOFC system that: provides for reforming at part-load operating conditions without the need for an external heat source; provides for an internal reforming SOFC stack to maintain thermal balance under part-load conditions; converts hydrocarbon fuels such as oil-based fuels, into a variable mixture of $CH_4$, $H_2$, and CO; exploits the superior performance of an internal reforming SOFC stack while achieving power generation under part-load conditions; and provides an internal reforming SOFC stack that reduces formation of tar and carbon within the SOFC stack.

SUMMARY OF THE INVENTION

In accordance with the invention, the one or more of the foregoing advantages have been achieved through the present process for generating electricity by a solid oxide fuel cell. The process comprises the steps of: transporting a hydrocarbon fuel through a pre-reformer at an hourly spaced velocity, the pre-reformer having a catalyst; contacting the hydrocarbon fuel with the catalyst in the pre-reformer for a pre-reformer residence time and at a pre-reformer temperature to form a catalyzed hydrocarbon fuel, the residence time being dependent upon the hourly spaced velocity and the catalyzed hydrocarbon fuel containing at least one gas including one or more of hydrogen gas, methane gas, carbon monoxide gas, or combinations thereof; transporting the catalyzed hydrocarbon fuel through a solid oxide fuel cell reformer at the hourly spaced velocity, the solid oxide fuel cell reformer having an anode, a cathode, and an electrolyte disposed between the anode and the cathode; and contacting the catalyzed hydrocarbon fuel with the anode for an anode residence time and at an anode temperature such that electricity is generated by the solid oxide fuel cell.

A further feature of the method is that the hydrocarbon fuel can be desulfurized to form a desulfurized hydrocarbon fuel prior to contacting the catalyst to form the catalyzed hydrocarbon fuel. Another feature of the method is that pre-reformer air can be injected into the pre-reformer while the hydrocarbon fuel is contacting the catalyst. An additional feature of the method is that the catalyst can include a noble metal selected from the group consisting of Rh, Ru, Pd, Pt, Ir, and combinations of one or more thereof. Still another feature of the method is that the hydrocarbon fuel can be selected from the group consisting of gasoline, naphtha, diesel and mixtures thereof. A further feature of the method is that the reforming process can be an internal reforming solid oxide fuel cell process. Another feature of the method is that the catalyzed hydrocarbon fuel can contact the anode to form an anode exhaust gas. An additional feature of the method is that the anode exhaust gas can be combusted. Still another feature of the method is that a portion of the anode exhaust gas can be transported to an anode recycle ejector/mixer and combined with a portion of hydrocarbon fuel prior to being transported to the pre-reformer. A further feature of the method is that a portion of the anode exhaust gas can be transported to a combustor and combusted. Another feature of the method is that cathode air can be injected into the cathode of the solid oxide fuel cell reformer while the catalyzed hydrocarbon fuel is contacting the anode. An additional feature of the method is that the cathode air can be pre-heated prior to being injected into the cathode of the solid oxide fuel cell reformer. Still another feature of the method is that a cathode gas can be formed during the time that the catalyzed hydrocarbon fuel contacts the anode. A further feature of the method is that the cathode gas can be transported to a combustor and combusted. Another feature of the method is that the cathode gas can be used to pre-heat the cathode air prior to the cathode air being injected into the cathode of the solid oxide fuel cell reformer. An additional feature of the method is that the pre-reformer temperature can be in the range from 250° C. to 800° C. Still another feature of the method is that the pre-reformer temperature can be in the range from 250° C. to 450° C. A further feature of the method is that the pre-reformer temperature can be in the range from 450° C. to 800° C.

In another aspect, one or more of the foregoing advantages have also been achieved through the present improved process for generating electricity from a solid oxide fuel cell through which a catalyzed hydrocarbon fuel is transported. The improvement comprises controlling electricity generation by adjusting the hourly spaced velocity of a hydrocarbon feed through the solid oxide fuel cell.

In an additional aspect, one or more of the foregoing advantages have also been achieved through the present process for controlling the concentration level of methane generated by a pre-reformer for injection into a solid oxide fuel cell. The process comprises the steps of: transporting a hydrocarbon fuel through a pre-reformer at an hourly spaced velocity, the pre-reforming having a catalyst; and contacting the hydrocarbon fuel with the catalyst in the pre-reformer for a pre-reformer residence time and at a pre-reformer temperature to form a catalyzed hydrocarbon fuel, the residence time being dependent upon the hourly spaced velocity and the residence time determining the concentration level of methane in the catalyzed hydrocarbon fuel.

The reforming SOFC process and reforming SOFC system have the advantages of: providing for reforming at part-load operating conditions without the need for an external heat source; providing for an internal reforming SOFC stack to maintain thermal balance under part-load conditions; converting hydrocarbon fuels such as oil-based fuels, into a variable mixture of $CH_4$, $H_2$, and CO; exploiting the superior performance of an internal reforming SOFC stack while achieving power generation under part-load conditions; and providing an internal reforming SOFC stack with a pre-processed feed stream having compositions that reduce formation of tar and carbon within the SOFC stack.

BRIEF DESCRIPTION OF THE DRAWINGS

FIG. 1 is a schematic of one specific embodiment of the processes disclosed herein.

While the invention will be described in connection with the preferred embodiments, it will be understood that it is not intended to limit the invention to that embodiment. On the contrary, it is intended to cover all alternatives, modifications, and equivalents, as can be included within the spirit and scope of the invention as defined by the appended claims.

DETAILED DESCRIPTION OF THE INVENTION

The invention is directed to processes that convert oil-based fuels to a variable mix of methane and hydrogen for solid oxide fuel cell applications. Generally, the process consists of a fuel pump, a desulfurizer, an air blower/compressor, a pre-reformer that contains noble metal catalysts, a cathode air blower/compressor, a SOFC stack, and an exhaust afterburner or combustor. The pre-reformer is essentially a chemical reactor. For large scale stationary applications, traditional scale-up methodology for chemical processes can be utilized. However, it is beneficial to consider mechanically and thermally integrating the pre-reformer with the integrated internal reforming SOFC stack for load varying applications. Examples are on-board a vehicle and domestic power generation applications in which packaging is a critical design dimension.

The product gases from the pre-reformer typically consist of $CH_4$, $H_2$, $H_2O$, CO, $CO_2$, and $N_2$. The variability of the compositions of product gases can be controlled by one or both of the pre-reformer temperature or by the hourly space velocity of the feeds to the pre-reformer (kinetically controlling the reaction rates). "Hourly spaced velocity" is defined herein as the actual gaseous volumetric flow rate of the hydrocarbon feed through the pre-reformer in liters per hour to the bulk catalyst volume in liters contained in the pre-reformer. Hourly spaced velocity is related to the residence time of the hydrocarbon feed. "Residence time" is the minimum time the hydrocarbon feed needs to remain within the pre-reformer and, thus, in contact with the known volume of catalyst contained therein, to achieve a desired conversion. The known volume of catalyst within the pre-reformer can be determined based on the maximum expected gaseous volumetric flow rate of the hydrocarbon feed.

The product gases are subsequently introduced to a SOFC stack for electricity generation. Anode and cathode exhaust gases from the SOFC stack are combusted either catalytically or non-catalytically in an after-burner to recover the calorific value contained in these exhausts gases from the SOFC stack.

The heat of the final exhaust can be used to satisfy preheating requirements of various feeds and product streams within the SOFC system or can be recovered for other heating purposes, such as space or domestic water heating. By adjusting the hourly rate spaced velocity, the methane concentration level of the pre-reformer's output can be adjusted, preferably as necessary to compensate for the varying power output requirement from the SOFC stack. For example, at lower power output requirements from the SOFC, a lower methane concentration output from the pre-reformer is desired. To achieve this lower level of methane concentration of the pre-reformer output, the hourly spaced velocity is decreased, thereby increasing the residence time and the conversion level of the hydrocarbon feed. With a higher conversion, the methane concentration of the pre-reformer's s output is expected to be lower.

Conversely, at full power output requirements from the SOFC, a higher methane concentration output from the pre-reformer is desired. To achieve this higher level of methane concentration of the pre-reformer output, the hourly spaced velocity is increased, thereby decreasing the residence time and the conversion level of the hydrocarbon feed. With a lower conversion, the methane concentration of the pre-reformer's output is expected to be higher.

In accordance with one aspect of the invention, the pre-reformer reduces the propensity for tar and carbon formation typically associated with internal reforming SOFC stacks that are directly fed with oil-based liquid petroleum fuels. Operating adiabatically at about 300° C., the pre-reformer converts liquid hydrocarbon fuels into a methane rich stream that is significantly less susceptible to tar and carbon formation than liquid hydrocarbon fuels at the operating temperature of internal reforming SOFC stacks, e.g., 750-800° C.

Additionally, the pre-reformer is able to produce a variable mix of methane, hydrogen, and carbon monoxide. The variable mix of methane, hydrogen and carbon monoxide fuel to SOFC stacks is desirable in that it allows the SOFC stack to operate under variable load conditions—a critical requirement for both grid-independent stationary and automotive applications.

The methane rich product gas from the pre-reformer enables full exploitation of the known advantages of the internal reforming capability of solid oxide fuel cell technology under full-load operating conditions. At the other end of the spectrum where the product gas is rich in hydrogen and carbon monoxide, the SOFC stacks are able to maintain thermal self-sustainability at part-load operating condition, without the need for an external heat source. The simple and low cost design of the pre-reformer provides an attractive add-on option to an oil-based internal reforming SOFC system.

In one specific embodiment of the present invention, a pre-reformer packed with noble metal, high activity catalysts such as Rh, Ru, Pd, Pt, Ir, or a combination of these with other well-known base metal active materials for reforming such as Ni, Mn, and Mg, is placed upstream of the SOFC stack. The pre-reformer provides for high catalyst activity at a reasonably low temperature, e.g., 300° C., for converting most liquid petroleum fuels into a $CH_4$ rich stream. The pre-reformer can be operated adiabatically, rendering a simple reactor design. Additionally, methane is less susceptible to carbon formation than liquid petroleum fuels at the SOFC operating temperature. Furthermore, with sufficient steam addition, carbon formation from methane can be significantly reduced and nearly prevented.

The volume of catalyst used in the pre-reformer is preferably sized at a high hourly space velocity so that at full power output requirement of the SOFC, i.e., maximum hydrocarbon feed flow, conversion of the hydrocarbon feed, e.g., liquid petroleum fuel, into hydrogen and carbon monoxide would be minimal because the reactants (fuel, steam and air) would have less time in the reaction zone of the pre-reformer for all the reforming reactions to proceed to thermodynamic equilibrium, resulting in output stream from the pre-reformer rich in methane.

At the low power output requirement of the SOFC, the hydrocarbon feed flow would be low and would have more contact time, i.e., residence time, with the catalyst in the pre-reformer reaction zone to achieve maximum conversion of the hydrocarbon feed into hydrogen and carbon monoxide.

The volume of catalyst capable of functioning as desired at both high and low hourly space velocities is easily determinable by persons skilled in the art without undue experimentation. In one specific embodiment, inert materials of similar shapes can be mixed with the pre-reforming catalysts to provide another level of manipulation to increase or decrease the hourly space velocity necessary to function at low and high power output requirements of the SOFC.

Moreover, thermocouples are preferably included in the system shown in FIG. 1 at the pre-reformer's outlet and at the integrated internal reforming SOFC stack or the cathode exhaust from the SOFC stack.

Pressure gauges are preferably included in the system shown in FIG. 1 immediately after the pump and between the desulfurizer output and the anode exhaust.

Flow meters are preferably included in the system shown in FIG. 1 immediately after the pump and immediately after the pre-reformer air blower.

Sampling points for gas chromatography analysis include the desulfurizer output, the pre-reformer input, and the pre-reformer output of the system shown in FIG. 1.

In another specific embodiment, a pre-reformer described above can also convert most liquid petroleum fuels into a $H_2$ and CO rich stream at a higher temperature, e.g., 750° C., under part-load conditions, i.e., proportionally lower fuel flow. The temperature of the pre-reformer can be controlled by air injection that helps combust a small quantity of fuels in the pre-reformer. Being richer in $H_2$ and CO, the heat requirement for internal reforming is less while internal heat generation is higher due to more electrochemical oxidation of $H_2$ and CO. Because, the thermal mass of the pre-reformer is expected to be small, the operating temperature of the pre-reformer is controlled via air injection by catalytically combusting a small and varying quantity of hydrocarbon fuels directly in the pre-reformer. Controlling the temperature and the air injection provides excellent dynamic response of the pre-reformer to meet load variation demand.

In still another specific embodiment, the pre-reformer operates as an isothermal reactor. Under full load or maximum flow, the reactor or the amount of active catalysts are sized to maximize the amount of methane in the product gas, essentially minimizing the residence time of the feed materials in the pre-reformer. At part-load or low flow conditions, the residence time is higher leading to a higher conversion of hydrocarbons to $H_2$ and CO. The size of the reactor controls the desired mix of $CH_4$, $H_2$, and CO in the product stream under various load conditions is optimized using non-catalytic ceramic balls mixed together with the high active pre-reforming catalysts. Therefore, for a given catalyst system it is possible to establish an operating map linking residence time with the extent of pre-reforming at various temperatures. Accordingly, this embodiment uses the kinetics of reforming rates to achieve the goal of meeting varying load demand from the internal reforming SOFC stack.

Referring now to the drawings, FIG. 1 shows a general schematic of the processes of the present invention. Using a pump, liquid petroleum fuels such as gasoline, naphtha or diesel, are pumped to a desulfurizer in which the sulfur level in the fuel stream is reduced to 1-2 parts per million by volume. While desulfurizers are known in the art, in one embodiment, the desulfurizer is a fixed bed configuration packed with adsorbents that preferentially adsorb sulfur species typically present in liquid petroleum fuels. While desulfurization may occur under various conditions, in another specific embodiment, a high temperature desulfurization method is utilized having a bed of cobalt-molybdenum catalysts followed by a zinc oxide adsorbent bed. The typical operating temperature of this method of desulfurization is 400° C. As is apparent to persons skilled in the art, a vaporizer and a heat exchanger are required to bring the vaporized petroleum fuels to the operating temperature of the high temperature desulfurizer.

The pressurized and desulfurized fuels subsequently act as motive fluid to drive an anode recycle ejector/mixer in which the desulfurized fuels, under high pressure, entrain and thoroughly mix with a portion of the anode exhaust which is rich in steam. The amount of anode exhaust re-circulated to anode recycle ejector/mixer is determined by how much steam is needed for the reforming reactions in the pre-reformer and can be controlled by the upstream pressure of the desulfurized fuels using the liquid petroleum fuel feed pump.

The pre-reformer is a packed bed containing noble metal, high activity catalysts such as Rh, Ru, Pd, Pt, Ir or a combination of these with other well known base metal active materials for reforming such as Ni. In one specific embodiment, the desulfurized fuels are steam-reformed to produce a mixture of $CH_4$, $H_2$, $H_2O$, $CO$, and $CO_2$. Air is injected into the pre-reformer using a blower or compressor. With the presence of air, some of the desulfurized fuels are catalytically combusted to provide heat for the steam reforming reaction and to maintain the temperature of the pre-reformer at a desired level. Typically, the pre-reformer operates between 300 and 550° C.; although it is capable of operating at temperatures up to 800° C. Lower operating temperatures provide a product stream rich in $CH_4$ and lean in $H_2$ and $CO$ and higher operating temperatures provide a product stream rich in $H_2$ and $CO$ and lean in $CH_4$. The variable range of concentrations of $CH_4$, $H_2$, and $CO$ assist the integrated internal reforming SOFC stack to economically and efficiently cope with varying load demand. Typical reactions for a hydrocarbon fuel, such as heavy naphtha ($C_8H_{16}$) in pre-reformers include the following:

$$C_8H_{16} + 8\, H_2O \leftrightarrows 16\, H_2 + 8\, CO \quad (1)$$

$$C_8H_{16} + 4\, O_2 \leftrightarrows 8\, H_2 + 8\, CO \quad (2)$$

$$C_8H_{16} + 12\, O_2 \leftrightarrows 8\, H_2O + 8\, CO_2 \quad (3)$$

$$3\, H_2 + CO \leftrightarrows CH_4 + H_2O \quad (4)$$

$$CO + H_2O \leftrightarrows H_2 + CO_2 \quad (5)$$

The reaction products from the pre-reformer are fed into the integrated internal reforming SOFC stack which operates at a temperature between 700-850° C. The product gases are further pre-heated within the anode gas distribution manifold which is integrated in the SOFC stack housing. Further pre-heating of the pre-reformed gases is used to minimize the temperature gradient, and hence thermal shock, when the gases come into contact with the thin anode layer.

On the anode layer, steam reforming of the remaining $CH_4$ takes place according to the following reaction:

$$CH_4 + H_2O \leftrightarrows 3\, H_2 + CO \quad (6)$$

In addition, the reaction products equilibrate via water gas shift reaction at the SOFC stack operating temperature as shown in equation (5). Reaction (5) is mildly exothermic and reaction (6) is highly endothermic.

Hydrogen and carbon monoxide undergo the following electrochemical reactions at the interface between the anode and the electrolyte according to the following reactions:

$$H_2 + O^{2-} \leftrightarrows H_2O + 2\, e^- \quad (7)$$

$$CO + O^{2-} \leftrightarrows CO_2 + 2\, e^-. \quad (8)$$

Suitable electrolytes includes yttria stabilized zirconia, scandium ceria stabilized zirconia, gadolinium doped ceria stabilized zirconia, samarium doped ceria stabilized zirconia at the various fractions of the active materials yttria, scandium, gadolinium and samarium.

The $O^{2-}$ anions are generated at the interface between the cathode and the electrolyte according to the following equation:

$$O_2 + 4\, e^- \leftrightarrows 2\, O^{2-} \quad (9)$$

These $O^{2-}$ anions are then transported across the highly ionic conductive electrolyte layer to the other side and combined with $H_2$ and $CO$ as shown in equations (7) and (8). These electrochemical reactions are highly exothermic and the heat release from these reactions is more than adequate to support the steam reforming reaction (6) thereby achieving direct thermal integration.

If a load is applied across the SOFC stack, electron flows can be permitted to complete an electrical circuit to generate DC power.

As further illustrated in FIG. 1, cathode air is supplied by a blower or compressor. The cathode air is then pre-heated externally in a heat exchanger using the hot cathode exhaust stream as a heating medium. It is further pre-heated within the cathode gas distribution manifold which is integrated in the SOFC stack housing.

Anode and cathode exhausts are fed from the integrated internal reforming SOFC stack to the combustor in which un-spent hydrocarbon fuels in the anode exhaust is either catalytically or non-catalytically combusted to recover the calorific value of the hydrocarbon fuel in the anode exhaust. The heat contained in the final exhaust can be recovered further for other heating purposes.

In accordance with the forgoing discussion, it is believed that full conversion of oil-based liquid petroleum fuels is achievable at temperatures as low as 250° C. Furthermore, desired compositions of product gases ($CH_4$, $H_2$, $H_2O$, $CO$ and $CO_2$ can be tailored depending on the selected operating temperature. For example, a methane rich gas can be produced in the temperature range of 300-400° C., while a $H_2$ and $CO$ rich stream can be produced at temperatures up to 800° C. with virtually no higher hydrocarbons remaining in the product gases.

As discussed above, the processes can be controlled, and the amount of product gases tailored, based on the hourly spaced velocity of the hydrocarbon feed through the pre-reformer and through the solid oxide fuel cell. For example, by increasing the hourly spaced velocity of the hydrocarbon feedstock through the pre-reformer, a methane rich product gas stream out of the pre-reformer can be maintained, even where the temperature in the pre-reformer is high, e.g., greater than 500° C. Conversely, by decreasing the hourly spaced velocity of the hydrocarbon feedstock through the pre-reformer, a $H_2$ and $CO$ rich stream, even at lower pre-reformer temperatures, e.g. below 400° C. Optimizing the hourly spaced velocity for production of the desired product gases is easily accomplished by persons skilled in the art without undue experimentation.

It is to be understood that the invention is not limited to the exact details of construction, operation, exact materials, or embodiments shown and described, as modifications and equivalents will be apparent to one skilled in the art. For example, while the specification expressly identified gasoline, naphtha, and diesel as liquid petroleum fuels, it is to be understood that any suitable hydrocarbon fuel can be utilized in the processes of the invention. Accordingly, the invention is therefore to be limited only by the scope of the appended claims.

What is claimed is:

1. A process for generating electricity by a solid oxide fuel cell, the process comprising the steps of:
desulfurizing a hydrocarbon fuel selected from the group consisting of gasoline, naphtha, diesel, and mixtures thereof to produce a desulfurized hydrocarbon fuel;
combining the desulfurized hydrocarbon fuel with an anode exhaust gas recycled from the solid oxide fuel cell;
supplying the desulfurized hydrocarbon fuel and anode exhaust gas through a pre-reformer at an hourly spaced velocity, the pre-reformer having a catalyst;
contacting the desulfurized hydrocarbon fuel and the anode exhaust gas with the catalyst in the pre-reformer for a pre-reformer residence time and at a pre-reformer temperature to form a methane-rich catalyzed hydrocarbon fuel, the methane-rich catalyzed hydrocarbon fuel including methane and one or more gases selected from hydrogen gas, carbon monoxide gas, and combinations thereof;
adjusting the conversion of the desulfurized hydrocarbon fuel to increase electrical power output from the solid oxide fuel cell by increasing the hourly spaced velocity of the desulfurized hydrocarbon fuel and anode exhaust gas through the pre-reformer such that conversion of the hydrocarbon fuel by the pre-reformer is decreased;
transporting the methane-rich catalyzed hydrocarbon fuel directly from the pre-reformer to a solid oxide fuel cell reformer at the hourly spaced velocity, the solid oxide fuel cell reformer having an anode, a cathode, and an electrolyte disposed between the anode and the cathode;
contacting the methane-rich catalyzed hydrocarbon fuel with the anode for an anode residence time and at an anode temperature such that electricity is generated by the solid oxide fuel cell; and
supplying the cathode gas and at least a portion of the anode gas to a combustor and combusting said gases.

2. The process of claim 1, wherein pre-reformer air is injected into the pre-reformer while the hydrocarbon fuel is contacting the catalyst.

3. The process of claim 1, wherein the pre-reformer catalyst includes a noble metal selected from the group consisting of Rh, Ru, Pd, Pt, Ir, and combinations of one or more thereof.

4. The process of claim 1, wherein the reforming process of the solid oxide fuel cell reformer is an internal reforming process.

5. The process of claim 1, wherein the methane-rich catalyzed hydrocarbon fuel contacts the anode to form an anode exhaust gas.

6. The process of claim 1, wherein cathode air is injected into the cathode of the solid oxide fuel cell reformer while the methane-rich catalyzed hydrocarbon fuel is contacting the anode.

7. The process of claim 6, wherein the cathode air is pre-heated prior to being injected into the cathode of the solid oxide fuel cell reformer.

8. The process of claim 1, wherein a cathode gas is formed during the time that the methane-rich catalyzed hydrocarbon fuel contacts the anode.

9. The process of claim 8, wherein the cathode gas is used to pre-heat the cathode air prior to the cathode air being injected into the cathode of the solid oxide fuel cell reformer.

10. The process of claim 1, wherein the pre-reformer temperature is in the range from 250° C. to 800° C.

11. A process for decreasing electricity generated by a solid oxide fuel cell, the process comprising the steps of:
desulfurizing a hydrocarbon fuel selected from the group consisting of gasoline, naphtha, diesel, and mixtures thereof to produce a desulfurized hydrocarbon fuel;
combining the desulfurized hydrocarbon fuel with an anode exhaust gas recycled from the solid oxide fuel cell;
supplying the desulfurized hydrocarbon fuel and anode exhaust gas through a pre-reformer at an hourly spaced velocity, the pre-reformer comprising a catalyst;
contacting the desulfurized hydrocarbon fuel and the anode exhaust gas with the catalyst in the pre-reformer for a pre-reformer residence time and at a pre-reformer temperature to form a methane-rich catalyzed hydrocarbon fuel, the methane-rich catalyzed hydrocarbon fuel including one or more gases selected from hydrogen gas, carbon monoxide gas, and combinations thereof;
adjusting the conversion of the hydrocarbon fuel to decrease electrical power output from the solid oxide fuel cell by decreasing the hourly spaced velocity of the desulfurized hydrocarbon fuel and anode exhaust gas through the pre-reformer such that conversion of the hydrocarbon fuel by the pre-reformer is increased;
transporting the methane-rich catalyzed hydrocarbon fuel directly from the pre-reformer to a solid oxide fuel cell reformer at the hourly spaced velocity, the solid oxide fuel cell reformer comprising an anode, a cathode, and an electrolyte disposed between the anode and the cathode;
contacting the methane-rich catalyzed hydrocarbon fuel with the anode for an anode residence time and at an anode temperature such that electricity is generated by the solid oxide fuel cell; and
supplying the cathode gas and at least a portion of the anode gas to a combustor and combusting said gases.

12. The process of claim 11, wherein pre-reformer air is injected into the pre-reformer while the hydrocarbon fuel is contacting the catalyst.

13. The process of claim 11, wherein the pre-reformer catalyst includes a noble metal selected from the group consisting of Rh, Ru, Pd, Pt, Ir, and combinations of one or more thereof.

14. The process of claim 11, wherein the reforming process of the solid oxide fuel cell reformer is an internal reforming process.

15. The process of claim 11, wherein the methane-rich catalyzed hydrocarbon fuel contacts the anode to form an anode exhaust gas.

16. The process of claim 11, wherein cathode air is injected into the cathode of the solid oxide fuel cell reformer while the methane-rich catalyzed hydrocarbon fuel is contacting the anode.

17. The process of claim 16, wherein the cathode air is pre-heated prior to being injected into the cathode of the solid oxide fuel cell reformer.

18. The process of claim 11, wherein a cathode gas is formed during the time that the methane-rich catalyzed hydrocarbon fuel contacts the anode.

19. The process of claim 18, wherein the cathode gas is used to pre-heat the cathode air prior to the cathode air being injected into the cathode of the solid oxide fuel cell reformer.

20. The process of claim 11, wherein the pre-reformer temperature is in the range from 250° C. to 800° C.

* * * * *